United States Patent [19]
Policky et al.

[11] Patent Number: 5,213,143
[45] Date of Patent: May 25, 1993

[54] STEERING AND PROPULSION MECHANISM FOR AGRICULTURAL FIELD VEHICLE

[75] Inventors: Price L. Policky, Astoria; Louis C. Fletcher, Jr., Hammond, both of Oreg.

[73] Assignee: Ag-Bag Corporation, Warrenton, Oreg.

[21] Appl. No.: 711,306

[22] Filed: Jun. 6, 1991

[51] Int. Cl.$^5$ .................. B65B 1/10; A01F 25/16; B65G 3/04
[52] U.S. Cl. .................. 141/71; 141/114; 141/10; 141/231; 100/100; 56/344; 180/236; 180/140
[58] Field of Search ............ 141/114, 10, 71, 73, 141/80, 313-, 317, 231; 100/100, 65, 177; 56/344, 166; 180/236, 140, 162

[56] References Cited

U.S. PATENT DOCUMENTS

| | | | |
|---|---|---|---|
| 2,769,502 | 11/1956 | Ziskal | 180/162 |
| 3,596,730 | 8/1971 | Cecce | 180/236 |
| 4,046,068 | 9/1977 | Eggenmuller | 100/65 |
| 4,256,031 | 3/1981 | Ryan | 100/65 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,653,553 | 3/1987 | Cox et al. | 141/114 |
| 5,052,508 | 10/1991 | Soejima | 180/140 X |

FOREIGN PATENT DOCUMENTS

2151116 8/1978 Fed. Rep. of Germany ...... 141/114

Primary Examiner—Ernest G. Cusick
Attorney, Agent, or Firm—Robert L. Harrington

[57] ABSTRACT

A field crop collection vehicle provides improved crop collection and storage. The vehicle steers through mutually orthogonal directions of travel and includes forward and reverse propulsion for accurate, quick and convenient field positioning in preparation for a bagging operation. During bagging, the vehicle is propelled by compaction force developed by placement of crop material with the storage bag and is steerable to more controllably place the storage bag upon the ground.

5 Claims, 6 Drawing Sheets

STEERING AND PROPULSION MECHANISM FOR AGRICULTURAL FIELD VEHICLE

FIELD OF THE INVENTION

The present invention relates to agricultural equipment and particularly to a field vehicle for compacting crop material within a large plastic storage bag.

BACKGROUND OF THE INVENTION

Storage of field crops, traditionally provided by structures such as silos and barns, can now be accomplished by large plastic storage bags. The bags, when filled with crop, extend typically up to twelve feet in diameter and up to 250 feet in length. A loading apparatus receives the field crop and controllably compacts the crop into the storage bag as the bag is deployed upon the ground behind the apparatus. The loading apparatus is equipped with an output feed rotor and the plastic storage bag is folded upon the loading apparatus with its open end exposed to the rotor to receive the crop material. The crop material is fed to the rotor and the rotor compacts the material in the bag as the bag is controllably deployed behind the loading apparatus. Thus, as the bag fills and unfolds from the loading apparatus, the apparatus moves away from the stationary portion of the bag lying on the ground.

A loading apparatus of this general type is described in U.S. Pat. No. 4,337,805 titled AGRICULTURAL BAG LOADING APPARATUS, issued Jul. 6, 1982 to Johnson et al., and assigned to the assignee of the present invention. The entire disclosure of U.S. Pat. No. 4,337,805 is incorporated herein by reference.

Forward propulsion for the loading apparatus results from the compacting force applied to the crop material within the bag. A stop positioned behind the bag and coupled to the loading apparatus by cables prevents rearward sliding of the bag. The cables wrap around drums on the loading apparatus and a brake mechanism of the drums resistively releases in response to pressure created as the rotor compresses the crop material. In other words, the loading apparatus is pushed forward by force feeding the crop material into the bag and against the stop. Thus, controlled crop compaction as well as forward propulsion is accomplished by resistively braking against forward movement resulting from loading of the storage bag.

The loading apparatus must be suitably positioned for each bagging operation. For example, to lay a storage bag along the edge of a field the loading apparatus must be first positioned along the field edge and pointed in a direction following the edge. If a second bag is to be laid down, the loading apparatus must be suitably repositioned within the field. Heretofore, such field repositioning between bagging operations has required manual wheel positioning, e.g., by crowbar, and coupling to a towing vehicle. Also, the loading apparatus must be movable between bagging sites, i.e., from field to field, typically along roadways. Such a loading apparatus typically cannot travel on roadways in its operational direction of travel due to its inordinate breadth. Accordingly, such a loading apparatus desirably travels also in a direction along its longitudinal axis, i.e., in a direction orthogonal to its operational direction of travel, for towing.

It has been suggested, in the above-noted U.S. Pat. No. 4,337,805, that the wheels of such a loading apparatus rotate through a steering angle of 90° whereby the loading apparatus may be moved for transport as well as for field positioning use. As noted above, such wheel manipulation has been provided only by manual means such as by crowbar use and such field positioning has been provided by towing the loading apparatus.

Given the basic structure and operation of such a loading apparatus, it may be appreciated that operational steering control, field positioning between bagging operations, and transportation between bagging sites along roadways, can be difficult. Generally, the direction of operational travel, i.e., during a bagging operation, has been largely uncontrolled resulting in meandering storage bag placement. Selective braking for steering, i.e. braking one side more than the other, has been attempted, but such braking complicates the crop compaction process because braking is used to control crop compaction within the storage bag.

Accordingly, it is desirable that a crop loading apparatus be capable of properly collecting field crop by controlled crop compaction within the storage bag, and be capable of traveling conveniently in both an operational direction and in a transport direction with steering functions independent of braking functions in both traveling directions.

SUMMARY OF THE INVENTION

In accordance with the present invention, an elongate agricultural crop loading vehicle includes a power assisted steering mechanism operable from an operator station providing a sufficiently broad range of steering for travel in mutually orthogonal directions, one an operational direction transverse to the elongate axis of the vehicle and the other a transport direction along the elongate axis of the vehicle. During operation, the vehicle compacts crop into a storage bag lying on the ground behind the vehicle with forward propulsion resulting from compacting pressure. During transport or field repositioning, propulsion is a accomplished by motors applying rotational force to the wheels. The operator can quickly switch steering modes between operational and transport, as well as enable crab steering.

The vehicle, given its broad range of steering and field positioning capabilities, is well suited for efficient crop storage and for transport between storage sites.

DETAILED DESCRIPTION OF THE PREFERRED EMBODIMENT

Figure 1:
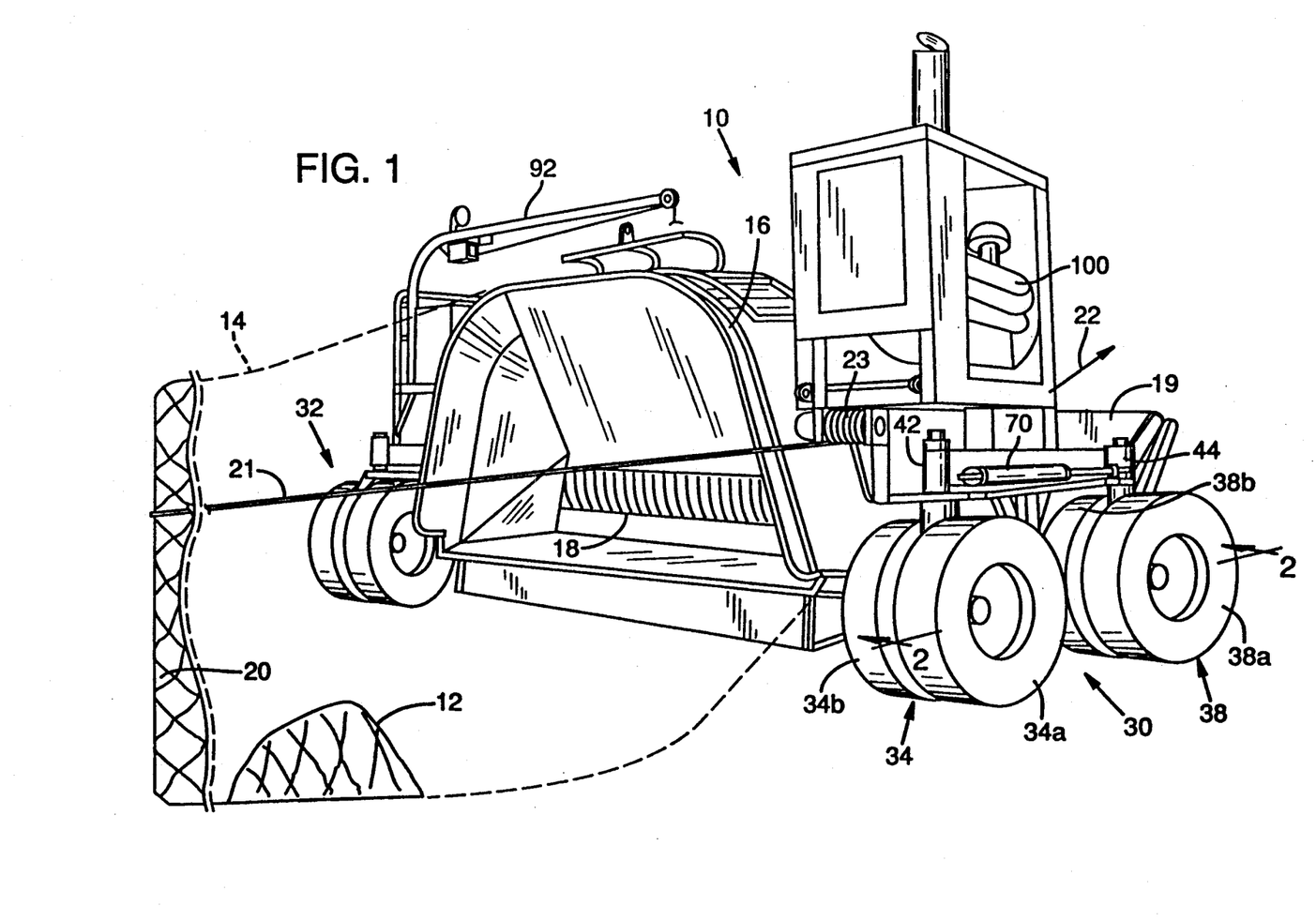
FIG. 1 is a perspective view of an agricultural field vehicle according to the present invention.

FIG. 1 illustrates an agricultural crop collection field vehicle 10. In the illustrated embodiment, vehicle 10 is adapted for collecting silage 12 and compacting silage 12 into storage bag 14, shown in phantom in FIG. 1. Crop loading is provided by bag 14 being folded over output tunnel 16 to receive from rotor 18 the silage 12. Silage 12 is deposited upon conveyor table 19 for delivery to rotor 18. Stop 20 captures the closed end of bag 14 and couples by way of cables 21 to vehicle 10. Cables 21 controllably extend by resistive braking of cable drums 23 to control relative movement between the stationary closed end of bag 14 and vehicle 10. As rotor 18 compacts silage 12 into bag 14, vehicle 10 is urged in the forward direction 22 due to such compaction force. Drums 23 are braked against movement of vehicle 10 in the forward direction 22. By controllably braking against the compaction force and allowing cables 21 to resistively extend, vehicle 10 moves in the forward direction 22 just as the compaction force exceeds the braking force applied to drums 23. In this manner, a desired level of silage 12 compaction, i.e., material density, within bag 14 as well as forward propulsion of vehicle 10 is achieved.

Figure 2:
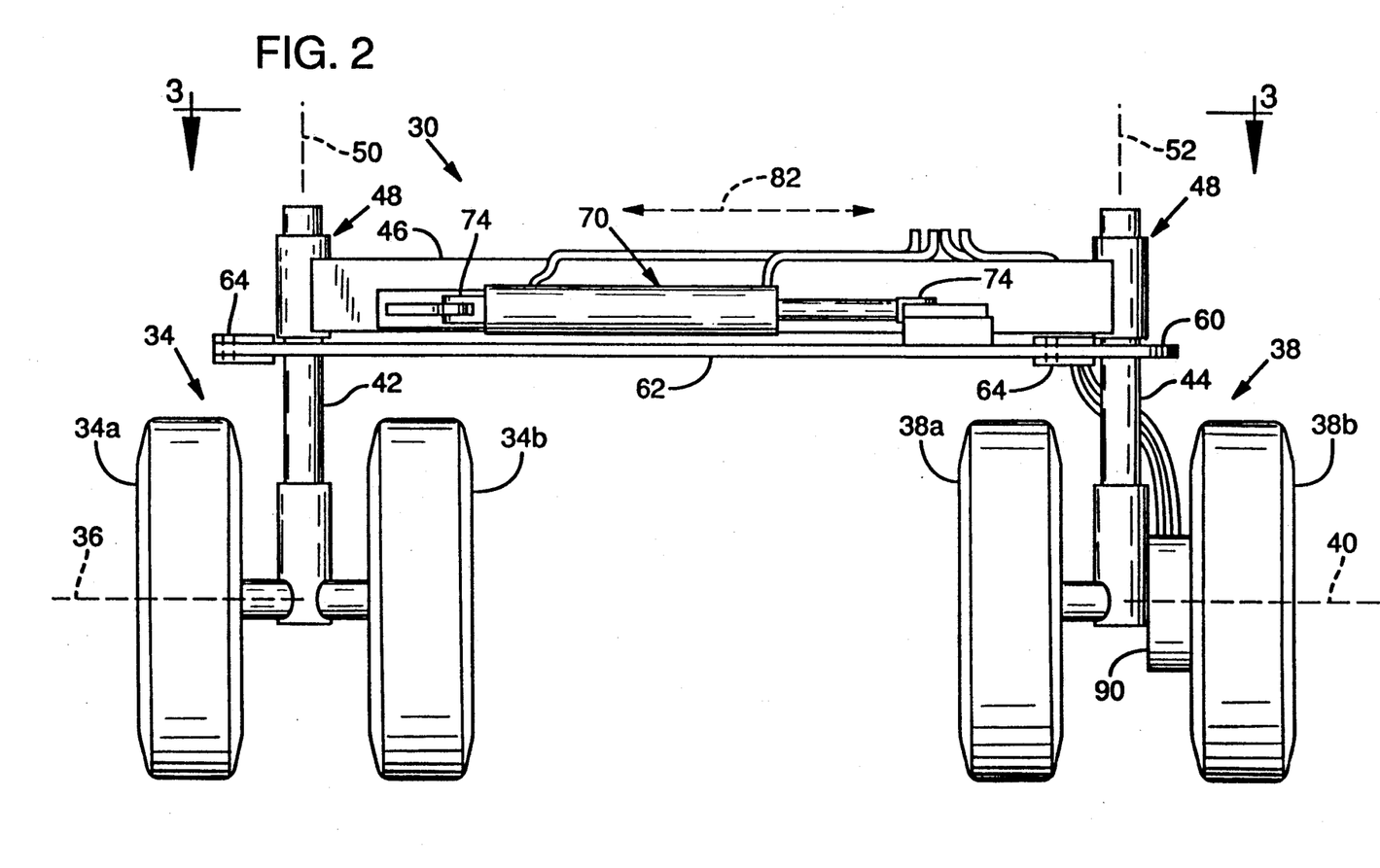
FIG. 2 is a view, as if taken along lines 2—2 at FIG. 1, of a steering mechanism of the vehicle of FIG. 1 but with the wheels turned 90 degrees relative to that shown in FIG. 1.
Figure 3:
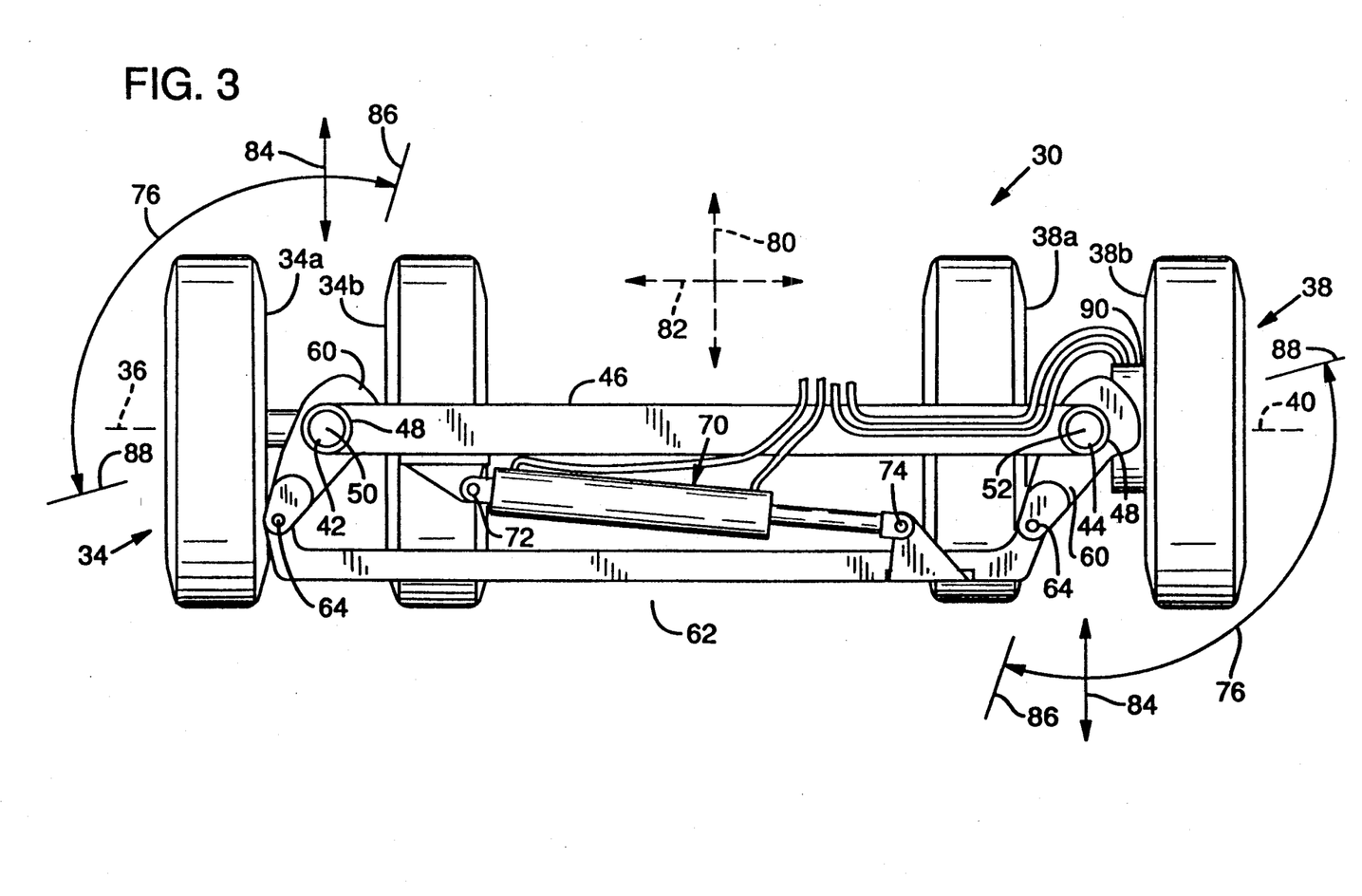
FIG. 3 is a top view of the steering mechanism of FIG. 2.

Vehicle 10 is generally elongate with a wheel support including wheel sets 30 and 32 providing steering therefor. With reference to FIGS. 2 and 3, each wheel set 30 and 32 comprises four wheels, a front wheel pair 34, individually 34a and 34b, sharing a common axis of rotation 36 and a rear wheel pair 38, individually 38a and 38b, sharing a common axis of rotation 40. It will be understood that the wheel set 32 is of similar arrangement and operation to that shown for wheel set 30 in FIGS. 2 and 3. It may be noted that the orientation of wheel sets 30 and 32 in FIG. 1 is orthogonal relative to the orientation shown for wheel sets 30 and 32 in FIGS. 2 and 3. As will be discussed more fully below, vehicle 10 is capable of travel in mutually orthogonal directions.

Front wheel pair 34 and a rear wheel pair 36 each rotatably mount upon a corresponding one of vertical steering shafts 42 and 44, respectively. Shafts 42 and 44 rotatably mount to frame 46 of vehicle 10, as indicated at bearing mounts 48, for rotation about corresponding vertical axes of rotation 50 and 52, respectively. Shafts 42 and 44 are held by bearing mounts 48 against vertical movement relative to frame 46. Shafts 42 and 44 lie orthogonal to the corresponding one of wheel axes of rotation 36 and 40, respectively. Wheel pairs 34 and 38 thereby support vehicle 10 by way of shafts 42 and 44 and by way of frame 46.

Vehicle 10 steering is provided by suitably rotating shafts 42 and 44 about the vertical axes of rotation 50 and 52, respectively. More particularly, by simultaneously rotating shafts 42 and 44 while maintaining a parallel relation between wheel axes of rotation 36 and 40, wheel pairs 34 and 38 steer in a common direction. To accomplish coordinated rotation of shafts 42 and 44, each shaft 42 and 44 includes a lever arm 60 fixedly attached thereto and extending radially outward therefrom. A push rod 62 rotatably couples, at the pins 64, the distal ends of lever arms 60. Push rod 62 is of proper length to maintain lever arms 60 in parallel relation. Thus, a parallelogram is defined by the lever arms 60 at first opposite ends and by the frame 46 and push rod 62 at second opposite ends. A hydraulic cylinder 70 couples to frame 46 by way of pin 72 at its cylinder end and couples to push rod 62 by way of pin 74 at its rod end. Actuating hydraulic cylinder 70 causes coordinated rotation of shafts 42 and 44 to provide coordinated steering of the wheel pairs of wheel set 30.

Wheel set 30 has an unusually wide steering range 76 including mutually orthogonal directions of travel, one direction being along the longitudinal axis 80, shown orthogonal to frame 46 in FIG. 3, of vehicle 10 and the other being the above-noted forward direction 22 along the transverse axis 82, shown parallel to the frame 46 in FIGS. 2 and 3, of vehicle 10. In the illustrated embodiment, lever arms 60 and the throw of hydraulic cylinder 70 are of sufficient length to move shafts 42 and 44 through 128 degrees of rotation to define the steering range 76.

The line of travel 84 for wheel set 30 is, as illustrated in FIG. 3, in alignment for movement along the axis 80. Retraction of hydraulic cylinder 70 moves wheel pairs 34 and 38 clockwise, as seen in FIG. 3, by as much as 28 degrees to bring the line of travel 84 to a first steering extreme 86. Extension of hydraulic cylinder 70, relative to that shown in FIG. 3, moves wheel pairs 34 and 38 through as much as 100 degrees of counter-clockwise rotation, as seen in FIG. 3, to place line of travel 84 at the other steering extreme 88 of steering range 76. Accordingly, when positioned for travel along axis 80, vehicle 10 may be steered by at least 28 degrees in either direction and when positioned for travel along the axis 82 vehicle 10 may be steered by at least 10 degrees in either direction.

A hydraulic motor 90 rotationally drives the wheel pair 38 for propelling vehicle 10. Motor 90 is bi-directional for forward and reverse rotation of wheel pair 38. As will be more fully discussed below, motor 90 is generally used for field positioning of vehicle 10 in preparation for a bagging operation.

Figure 4:
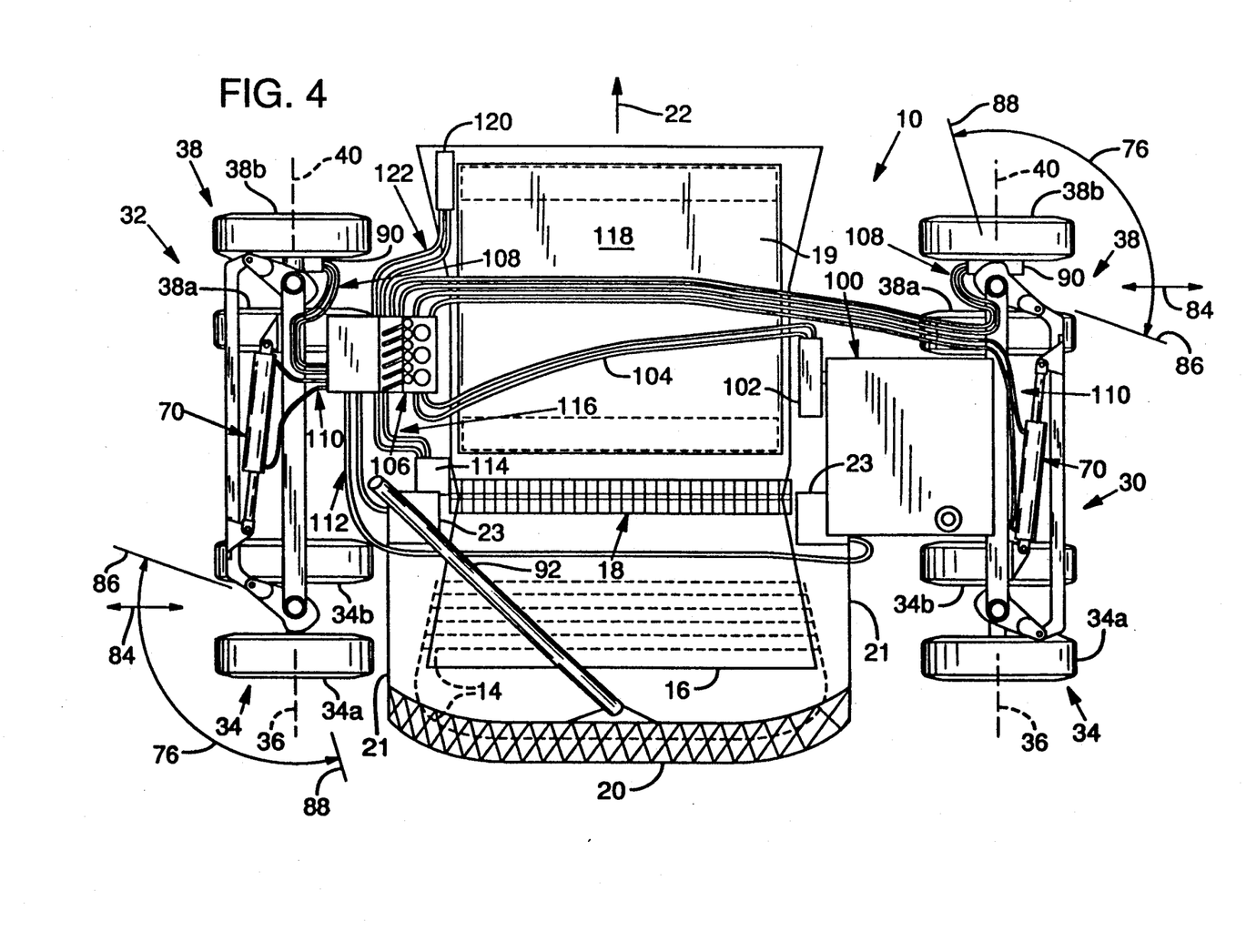
FIG. 4 is a top schematic view of the field vehicle of FIG. 1 in a field positioning configuration.

FIG. 4 is a top schematic view of the field vehicle 10 in a field positioning configuration, i.e., prior to a bagging operation. In FIG. 4, bag 14 is mounted to output tunnel 16 and ready to receive silage from rotor 10. As portrayed, however, bag 14 has not yet been deployed upon the ground. Boom 92 (shown in perspective in FIG. 1) of vehicle 10 supports bag 14 at the mouth of output tunnel 16. In such configuration, vehicle 10 may be suitably positioned in preparation for a bagging operation.

FIG. 4 shows details of the other wheel set 32 as well as a hydraulic power circuit for operation of vehicle 10. Reference numerals earlier applied to the elements of wheel set 30 are similarly applied to the wheel set 32. Wheel set 32 includes a motor in the form of a hydraulic cylinder 70 used to move all wheels of wheel set 32 through a steering range 76 similar to that shown for the wheel set 30. Wheel set 32 also includes a hydraulic motor 90 coupled for rotationally driving the corresponding wheel pair 38 in forward and reverse rotational directions about the corresponding axis 40.

Accordingly, it will be appreciated that by coordinated actuation of hydraulic cylinders 70, a desired direction of travel 84 for wheel sets 30 and 32 is achieved. For example, to maintain parallel the axes of rotation 36 and 40 of wheel set 30 with the axes of rotation 36 and 40 of wheel set 32, hydraulic cylinders 70 would extend in unison and retract in unison by similar amounts. Also, by retracting one cylinder 70 and extending the other cylinder 70, counter clockwise movement of one of wheel sets 30 and 32 results while clockwise rotation of the other one of wheel sets 30 and 32 results.

Field vehicle 10 includes a diesel power plant 100 which drives a hydraulic pump 102. Pump 102 couples by way of hydraulic lines 104 to an operator station 106 to thereby provide the controls for operator steering. Operator station 106 includes various lever controls and gauges for manipulation of the hydraulic system. Each motor 90 couples to operator station 106 by way of corresponding hydraulic lines 108. Each hydraulic cylinder 70 also couples by way of corresponding hydraulic lines 110 to operator station 106. Hydraulic lines 112 couple respective ones of cable drums 23 for controlled braking of drum 23 rotation. Rotor 18 is driven by a hydraulic rotor motor 114 which in turn receives power from operator station 106 by way of hydraulic lines 116. Table 19 comprises a conveyor belt 118 actuated by table motor 120 which in turn is driven from operator station 106 by way of hydraulic lines 122.

It will, therefore, be understood that a person positioned at operator station 106 has control over the various devices of vehicle 10. More particularly, the operator may independently control each hydraulic cylinder 70 in order to independently determine the steering direction of each wheel set 30 and 32 as well as control each motor 90 for propelling vehicle 10 in a desired direction.

Figure 5:
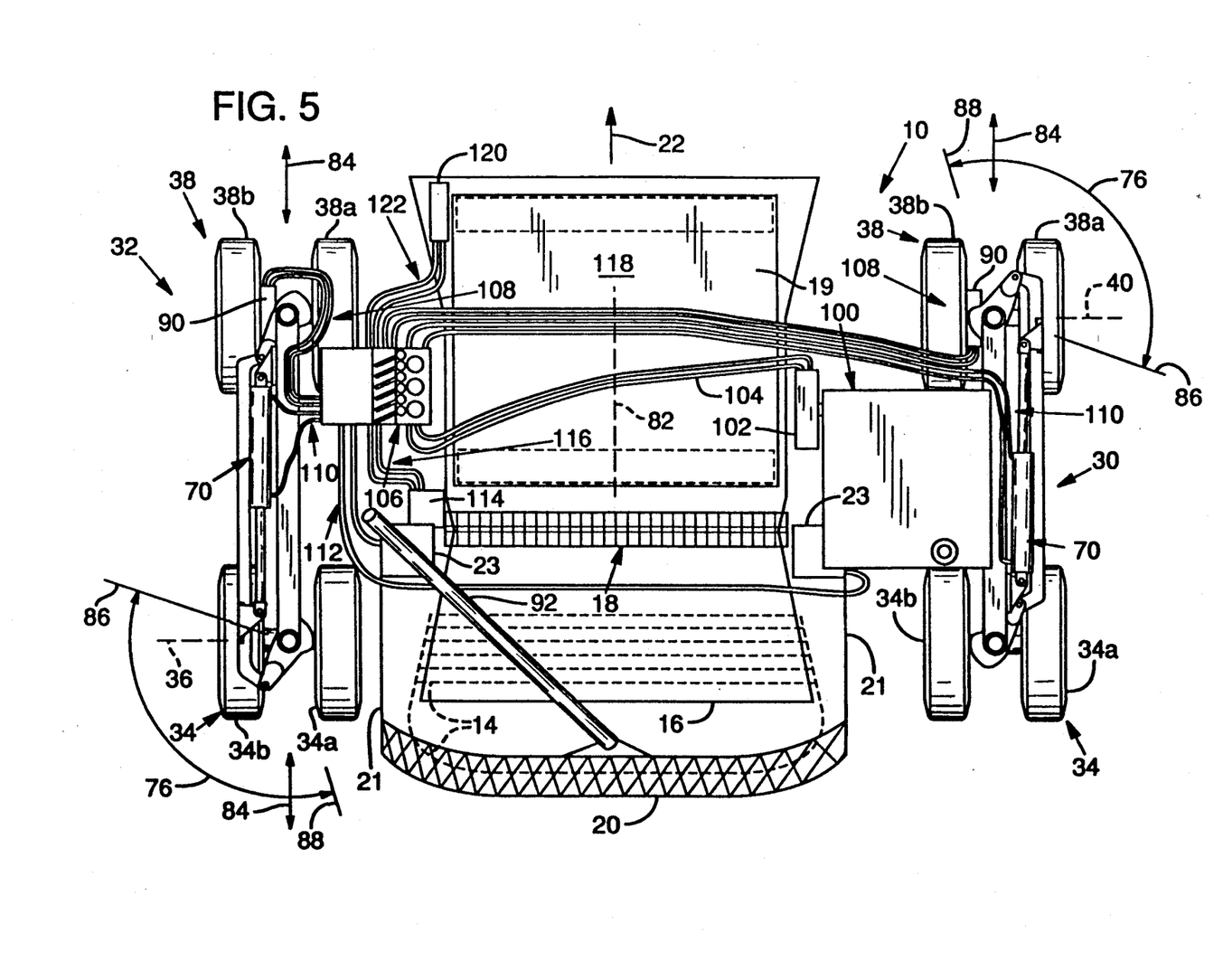
FIG. 5 is a top schematic view similar to FIG. 4, but showing the field vehicle in an operational configuration.

With reference to FIG. 5, once the operator positions vehicle 10 in alignment for a bagging operation, bag 14 is released from boom 92 for deployment upon the ground. Table 19 then brings silage 12 deposited on conveyor 118 against the rotor 18. Rotor 18 is actuated by operation of rotor motor 114 and the silage 12 is delivered by way of output tunnel 16 to bag 14 for compaction therein. The operator controllably brakes the drums 23 in order to control deployment of bag 14 behind vehicle 10 as well as movement of vehicle 10 in the forward direction 22.

Wheel sets 30 and 32 are oriented, by way of hydraulic cylinder 70 actuation, for travel along the forward direction 22. Such forward motion, it is noted, results from the operation of rotor 18 compacting silage 12 within bag 14 and the yieldably resistant braking action of drums 23, cables 21, and stop 20. As vehicle lo moves in the forward direction 22, control over the steering of vehicle 10, and therefore the overall deployment of bag 14, is provided by operation of hydraulic cylinders 70. More particularly, by coordinated operation of cylinders 70, vehicle 10 is provided with crab steering during bagging operations for highly controlled positioning of vehicle 10. In this manner, deployment of bag 14 may be along a desired path, typically a straight line.

Figure 6:
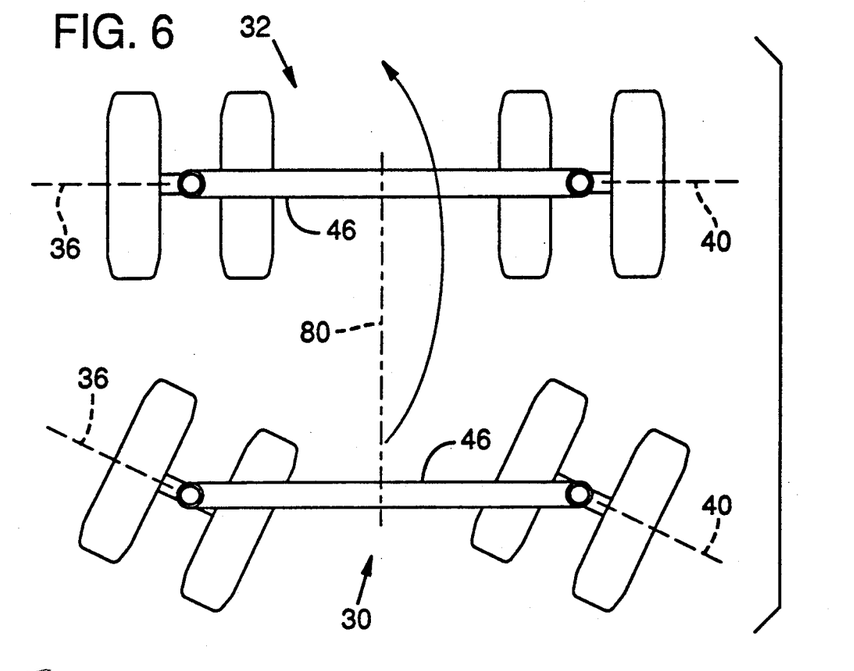
FIGS. 6—7 illustrate several of the variety of steering capabilities of the field vehicle of FIG. 1.

FIG. 6 illustrates a field positioning steering mode for vehicle 10 wherein wheel set 32 is oriented for travel along the longitudinal axis 80 and wheel set 30 is steered by operation of the corresponding hydraulic cylinder 70. In this mode of travel, forward and reverse propulsion is available by operation of hydraulic motors 90. The operator may also move (not shown) the wheel set 32, in the opposite rotational direction as that illustrated for the wheel set 30, in order to provide very tight turning radius for vehicle 10.

Figure 7:
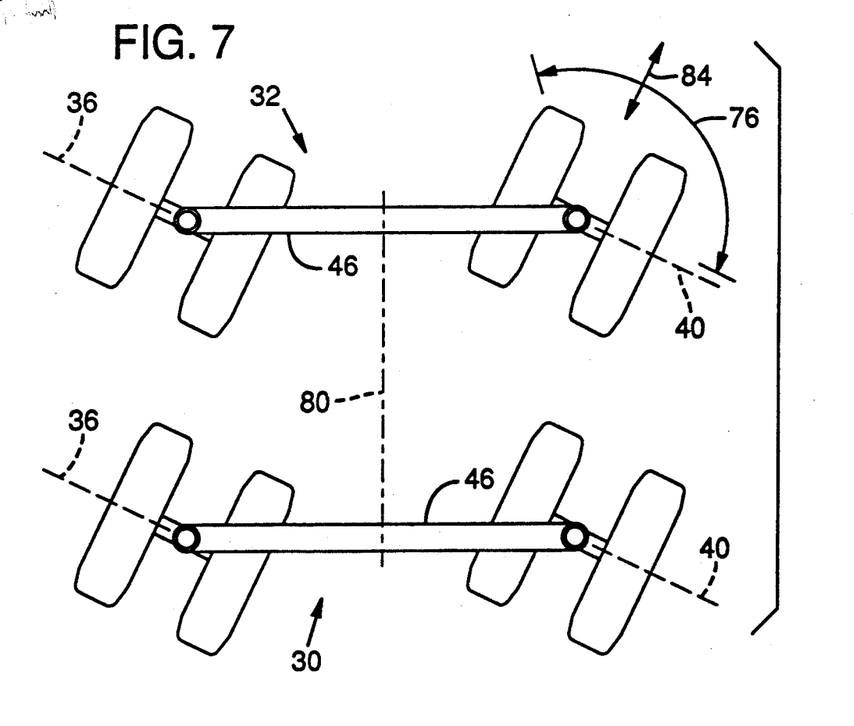

FIG. 7 illustrates a crab mode field positioning of vehicle 10. In FIG. 7, hydraulic cylinders 70 are actuated in unison, i.e., each extending and retracting in unison, such that the axes of rotation 36 and 40 of wheel sets 30 and 32 remain parallel whereby crab steering in forward and reverse directions within the steering range 76 is available if needed for field positioning.

As will be appreciated by those skilled in the art, given the bi-directional ability of motors 90 and the independent steering control of wheel sets 30 and 32 through 128 degrees of steering, vehicle 10 is well adapted for agile field positioning in preparation for bagging operations. The steering configurations shown in FIGS. 6 and 7 are only examples of the wide variety of vehicle 10 steering capabilities.

Thus, an improved steering and propulsion mechanism for a field crop loading vehicle has been shown and described. The field vehicle 10 may be provided with operational propulsion in the direction 22, along the transverse axis 82, by way of the compaction of silage 12 within bag 14. The second propulsion mechanism includes the motors 90 coupled to wheels set 30 and 32. The second propulsion mechanism includes both forward and reverse directions. The steering mechanisms of wheel sets 30 and 32 provide a broad range of steering capability whereby, in combination with the dual propulsion mechanisms provided by vehicle 10, efficient crop collection and storage within bag 14 is provided. The vehicle 10, having such broad range of steering capabilities and dual propulsion mechanisms, is well adapted for controlled deployment of bag 14 as well as convenient and rapid field positioning between each bagging operation.

It will be appreciated that the present invention is not restricted to the particular embodiment shown herein and that variations may be made thereon without departing from the scope of the invention as found in the appended claims and equivalents thereof.

We claim:

1. An agricultural crop loading apparatus comprising:
   wheeled support means and a steering mechanism therefore including;
   four wheel sets, each set pivotally mounted to said apparatus about a vertical axis for directional turning of each wheel set, at least one wheel in each wheel set, said wheel sets separated into two pairs of wheel sets, a linkage between the wheel sets of each pair affixing the wheel sets in a parallel relationship for simultaneous turning of the wheel sets of each pair of wheel sets, and a motor for each pair of wheel sets for independent power turning of the respective pairs of wheel sets through a sufficiently broad range of turning for travel of said apparatus in at least two mutually orthogonal directions relative to said apparatus;
   a storage bag and crop loading means for compacting crop material within said storage bag coupled to said apparatus, said loading means causing as a result of crop compaction in said bag, operational propulsion of said apparatus along a line of travel coincident to a first one of said at least two mutually orthogonal directions; and
   an operator station provided on said apparatus, control means for independent operation of said motors of said paired wheel sets from said operator station of said apparatus whereby said apparatus may be first directed by operation of said steering mechanism in said one of said orthogonal directions, and then in the other orthogonal direction.

2. An apparatus according to claim 1 wherein said range of steering is greater than 90 degrees of steering whereby said apparatus has steering control about each of said two mutually orthogonal directions.

3. A field vehicle according to claim 1, further comprising a field positioning propulsion means operable form said operator station by way of said control means to apply rotational force to wheels of said wheeled support means whereby said apparatus is propelled in selected directions within said steering range as determined by said steering mechanism.

4. A field vehicle adapted for crop storage with a storage bag deployed upon the ground, the vehicle comprising:

at least two pairs of spaced apart wheel sets supporting said field vehicle and each wheel set pivotable about a vertical axis for directional turning;

the wheel sets of each pair of wheel sets linked together in fixed parallel alignment, a motor for turning each pair of wheel sets and a steering control controlling said motors to provide steering means for selectively steering said wheel sets along corresponding lines of travel, each of said lines of travel being movable through greater than 90 degrees of rotation relative to a corresponding vertical axis;

first propulsion means for applying forward and reverse rotational forces to selected ones of said plurality of wheels;

a storage bag adapted for coupling to said vehicle and deployment upon the ground; and crop collection and second propulsion means for compacting crop within said bag while controllably urging said vehicle in an operational direction of travel, whereby said vehicle may by operation of said steering means and said first propulsion means be positioned for a bagging operation wherein said crop collection and second propulsion means may be operated in conjunction with said steering means to deliver crop into said storage bag as said bag is controllably deployed upon the ground along a path corresponding to operation of said steering means.

5. An elongate agricultural field vehicle having an operational direction of travel transverse to its elongate axis and a transport direction of travel along its elongate axis, the vehicle comprising:

first, second, third and fourth wheels supporting said vehicle, first, second, third and fourth vertical steering shafts provided for said first, second, third and fourth wheels, each of said wheels defining an axis of rotation whereby selective rotational positioning of the corresponding steering shaft about its vertical axis selectively positions the axis of rotation for the corresponding wheel within a horizontal plane and relative to the elongate axis of said vehicle;

first linkage means coupling the first and second steering shafts whereby the axes of rotation for said first and second wheels are similarly positioned relative to said elongate axis of said vehicle;

second linkage means coupling the third and fourth vertical steering shafts whereby the axes of rotation for said third and fourth wheels are similarly positioned relative to said elongate axis of said vehicle;

actuation means for controlling said first and second linkage means whereby the axes of rotation for said first, second, third and fourth wheels are controllably positioned relative to the elongate axis of said vehicle;

transport propulsion means comprising motor means coupled to at least two of said wheels for rotation of the corresponding wheel about its axis of rotation; and operational propulsion means comprising a crop receiving bag of which a portion is stationary with respect to the ground, means for collecting a crop product, and means for compacting said crop product into said bag whereby such compaction urges said vehicle into motion relative to the ground, whereby said vehicle is selectively propelled in said operational direction by said operational propulsion means in coordination with said actuation means positioning each of said axes of rotation substantially transverse to said elongate axis and is propelled in said transport direction by said transport propulsion means in coordination with said actuation means positioning each of said axes of rotation substantially parallel to said elongate axis.

* * * * *